(No Model.)
H. WALLACE.
Steam Trap.
No. 234,095.  Patented Nov. 2, 1880.
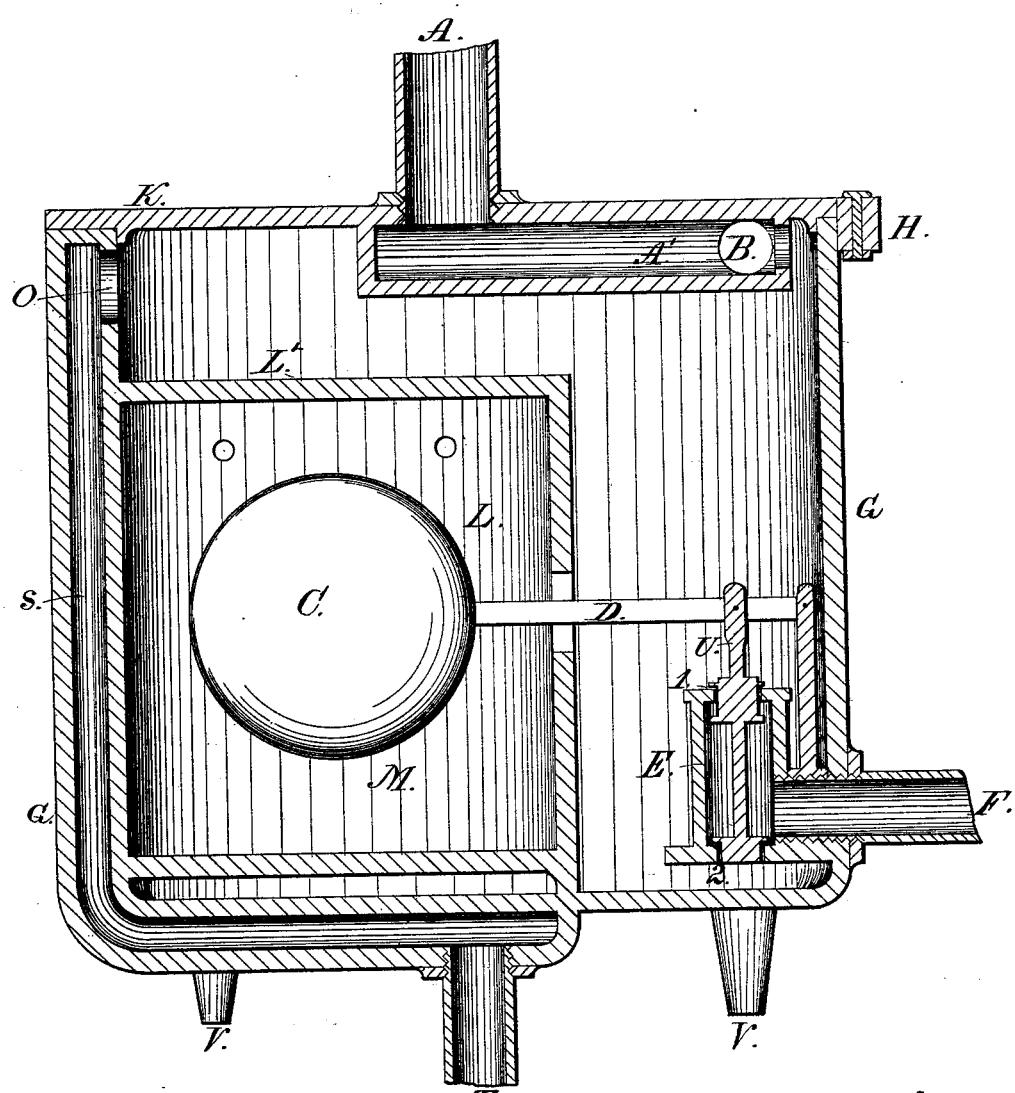
Witnesses:
L. L. Richmond
J. V. M. Richmond
Inventor:
Hary Wallace
by his atty
A B Richmond

UNITED STATES PATENT OFFICE.

HARY WALLACE, OF BRADFORD, PENNSYLVANIA, ASSIGNOR TO EDWIN W. BARKER, OF SAME PLACE.

STEAM-TRAP.

SPECIFICATION forming part of Letters Patent No. 234,095, dated November 2, 1880.

Application filed June 9, 1880. (No model.)

*To all whom it may concern:*

Be it known that I, HARY WALLACE, of Bradford, in the county of McKean, State of Pennsylvania, have invented a new and Improved Steam-Trap for Steam-Engines, Steam-Pumps, Heaters, and other Steam Apparatus, of which the following is a specification.

My invention relates to improvements in devices by which steam is conveyed through pipes from the boiler to the engines, pumps, or heaters such a distance as allows the steam to cool and condense into water, and thereby clog or stop the pipes through which it is conveyed.

The object of my invention is to catch all the water from the condensed steam and permit it to be discharged without permitting the steam to escape, and thereby only admit dry steam into the engine, pumps, and heaters of steam appparatus wherever steam is used. I attain this object by the mechanism illustrated in the accompanying drawings, in which—

G G G represent a sectional view of a tank of metal with a cover, K H, bolted to the tank steam-tight.

A A' is a steam-pipe from the boiler. It passes through the cover K of the tank, and has an opening, B, on the same, through which the steam is admitted into the tank.

O is an opening into the steam-pipe S S, through which the steam passes into the induction-pipe T, and from thence into engine, pump, or heater. This tank is placed at the engine, pump, or heater end of the steam-pipe A, that leads from the boiler. The steam, having passed through some length of pipe, before it reaches the trap or tank, has cooled, condensed, and as it enters the tank it drops the water, as shown at M, in the bottom of the tank, and the dry steam passes through the pipe S S and T to the engine, pump, or heater.

C is a hollow metal ball or float on the end of the lever D, attached to a valve-stem at U.

E is a valve-chamber with a discharge-pipe, F, through which the water is discharged. The valve-chamber has a double valve, 1 and 2, on the valve-stem, which passes through the valve-chamber E, with a valve hole or seat at the top and bottom. As the lever D is raised it raises the valve-stem U and opens both valves 1 and 2 and lets the water into the chamber E, from whence it escapes through the pipe F. When the water from the condensed steam rises in the tank it raises the ball or float C and opens the valves 1 and 2, and permits the water to be discharged, as aforesaid. The pressure of the steam on the water will force it out until the float sinks, so as to close the valves 1 and 2. By this construction of a double valve, 1 and 2, it will be seen that when the steam presses on the water the water presses up on the lower valve, 2, with the same force that it presses down on the valve 1. This makes the valves 1 and 2 a balance-valve, and it is therefore easily operated by the float C.

L L' is a partition that covers the float C in such a manner as to protect the float C from the immediate action of the steam admitted through the opening B of the steam-pipe A A'.

V V are legs or supports for the tank.

What I claim as my invention is as follows, to wit:

1. The trap-tank G, having induction-opening A and eduction-opening T, for the passage therethrough of live or dry steam, in combination with the opening F, for the discharge of the water of condensation, provided with the double valves 1 2, mounted upon the same stem, and controlled by the float C, adapted to operate within a secondary perforate chamber having the walls L L', substantially as and for the purpose set forth.

2. The trap-tank G, having an induction and eduction opening for steam, and a discharge-opening for the escape of the water of condensation, controlled by a valve and float, the latter being surrounded by a secondary perforate partition, L L', to protect it from the immediate action of the steam, substantially as set forth.

3. The trap-tank G, having the induction-opening A, provided with the lateral steam-passage A', and the eduction-opening T, provided with the lateral steam-passage S, both passages, A and S, lying within the tank-casing, and communicating with the tank-reservoir at their tops, in combination with discharge F, having double valve 1 2, controlled by float C, substantially as set forth.

HARY WALLACE.

Witnesses:
H. J. SWETT,
J. M. DENNY.